United States Patent [19]

Elliott

[11] Patent Number: 4,564,507
[45] Date of Patent: Jan. 14, 1986

[54] REDUCTIVE DECONTAMINATION OF MAGNESIUM FLUORIDE

[76] Inventor: Guy R. B. Elliott, 133 La Senda Rd., Los Alamos, N. Mex. 87544

[21] Appl. No.: 544,472

[22] Filed: Oct. 24, 1983

[51] Int. Cl.⁴ .......................... C01G 43/00; G21F 9/00
[52] U.S. Cl. ........................................ 423/5; 252/626; 423/178; 423/158
[58] Field of Search ..................... 252/626, 631; 423/5, 423/490, 497, 439, 178, 158, 256, 259; 75/84.1 A, 84.1 R

[56] References Cited

U.S. PATENT DOCUMENTS 2,789,897  4/1957  Sawyer et al. .................. 75/84.1 R
3,154,378  10/1964  Schneider et al. ................. 423/256
3,332,750  7/1967  Beucherie et al. ................. 423/256

Primary Examiner—Edward A. Miller
Assistant Examiner—Virginia Caress

[57] ABSTRACT

A method is described for decontaminating magnesium fluoride resulting from the reduction of uranium fluoride to the metal by reaction with magnesium. This decontamination employs reactions with magnesium and carbon to remove radioactive components from the said magnesium fluoride in its molten state.

12 Claims, 2 Drawing Figures

REDUCTIVE DECONTAMINATION OF MAGNESIUM FLUORIDE

BACKGROUND OF THE INVENTION

1. Field of the Invention

Nuclear reactors are frequently operated with uranium enriched in the isotope $U^{235}$. The by-product of such enrichment is depleted uranium, commonly called "DU" in military circles. At typical enrichment levels, the production of a pound of enriched uranium will produce 125 pounds of depleted-uranium by-product, available as $UF_4$.

All the U.S. military services are now using projectiles made from depleted-uranium alloys for armor penetration, and this usage is increasing rapidly. (No nuclear reactions are involved in such armor penetration.) Preparation of the projectile alloys involves the reduction of depleted-uranium $UF_4$ with magnesium:

$$UF_4 + 2Mg = U + 2MgF_2 \quad (1)$$

and the reaction may take place in stages:

$$2UF_4 + Mg = 2UF_3 + MgF_2 \quad (2)$$

$$2UF_3 + 3Mg = 2U + 3MgF_2 \quad (3)$$

These reduction reactions are carried out in large, steel reaction vessels which are capable of withstanding transient internal pressures of hundreds of pounds per square inch when the vessel has been heated by an external furnace to a temperature of 700° C. and when the reaction zone inside the vessel is at a transient temperature of 1600° C. Magnesium metal powder in small excess and uranium fluoride powder are mixed and are placed in a reaction vessel with a liner to protect the steel against attack. Next, the vessel is sealed and heated to about 650° C., at which temperature the magnesium-uranium fluoride charge ignites, heats itself to a high temperature, and forms molten magnesium fluoride and molten, depleted-uranium metal which separate as a fluoride layer floating on a metal layer. With successful reactions, frozen fluoride can be chipped off the metal.

As will be discussed below, the thermodynamics is satisfactory for the desired reactions. Specifically, if the system really could come to equilibrium following reaction of pure chemicals in unreactive vessel liners, the reaction products would be clean depleted uranium plus magnesium fluoride almost free of radioactive components. In fact, for true equilibrium conditions with high-purity chemicals in a pressurized vessel, the calculated content of uranium in the magnesium fluoride would be only about 10 parts per million. But that decontamination level is idealized.

In practice, the magnesium fluoride which is broken free from the frozen uranium contains a few percent of radioactive components as: (a) pockets of uranium oxide, (b) unreacted uranium fluorides trapped in the molten, magnesium-fluoride residue during the transient high-temperature reaction, (c) droplets of uranium which have failed to settle, e.g., those at a dirty metal-salt interface region, (d) unreacted materials from poorly sealed vessels, and (e) thorium decay products introduced from the uranium, especially $Th^{234}$ with 24-day half life.

Substantially because of the radioactive components just mentioned, the magnesium fluoride residues from depleteduranium production cannot be discarded as simple chemical waste. Rather, they must be handled as mildly radioactive material, with all the associated expense, difficulties, and inconvenience of handling radioactivity. Specifically, without decontamination, disposal of radioactive magnesium fluoride costs about $100 per barrel in direct costs for shipment to burial and considerably more than that when indirect costs in factory inconvenience are included. No method or device has previously been developed to effect decontamination of the magnesium fluoride adequate to allow it to be treated as nonradioactive.

The present invention offers a new method of achieving the desirable decontamination through an unobvious combination of known chemical reactions which obey known thermodynamic relationships. Likewise, the present invention describes, but does not claim, apparatus uniquely designed to carry out the said decontamination.

2. Prior Art

Many publications tabulate thermodynamic enthalpies, entropies, and free energies for the formation of compounds of current interest, e.g., the Bureau of Mines Bulletin 605 and the JANAF Thermochemical Tables. By using techniques known to those versed in the art, the values tabulated can be modified to allow for new measurements published after the tabulations were prepared. Activity coefficients for components of solutions are known to be estimable from published phase diagrams and by analogy with similar systems for which better data are available. Such activity coefficients, when multiplied by component concentrations, give thermodynamic activities. Equilibrium relationships such as compositions of phases are known to be calculable from data such as these.

Although the chemical and thermodynamic information used for the present invention has been derived from publications in the open literature, the selection of suitable reactions and proper conditions from the multitude of possibilities is not obvious, even to one highly skilled in the art. Furthermore, the problems of magnesium fluoride disposal are recognized as troublesome by the military services, e.g., the Army Research and Development Center at Dover, New Jersey, whose personnel have been searching for a suitable decontamination procedure.

3. Definitions

The chemical reactions employed in the present invention, unless otherwise specified, may be applied for solutions as well as for pure components. To include both solutions and pure components, the term "magnesium reductant" is used to describe both metallic magnesium and magnesium alloys. Also, uranium fluoride, either alone or combined with other salts, may be reduced by magnesium reductant, thereby forming either uranium metal or uranium alloy; therefore, the term "uranium-fluoride" is used to describe both the pure material and its mixtures or solutions. Furthermore, the term "carbon" is used to describe the different elemental structures (such as amorphous carbon or graphite) as well as carbon compounds (such as silicon carbide).

OBJECTS OF THE INVENTION

The principal object of this invention is to provide a practical method for substantially removing radioactive components from residues comprising magnesium fluoride which residues formed during the reduction of uranium fluoride or uranium-fluoride mixtures to metallic uranium or its alloys.

Other objects, advantages, and novel features of this invention will be apparent to those of ordinary skill in the art upon examination of the following detailed description of preferred embodiments of the invention and the accompanying drawings.

SUMMARY OF THE INVENTION

A method is provided for substantial removal of radioactive components from residues comprising magnesium fluoride, such residues having resulted from the production of uranium or its alloys through reduction of uranium fluoride by magnesium. The method comprises contacting contaminated molten fluoride with both carbon and dissolved magnesium, the said contact being capable of substantially removing uranium fluorides and uranium metal from the magnesium-fluoride residues. Uranium oxide can also be removed, but here a preliminary chemical step may sometimes be required.

DESCRIPTION OF THE PREFERRED EMBODIMENTS

Figure 1:
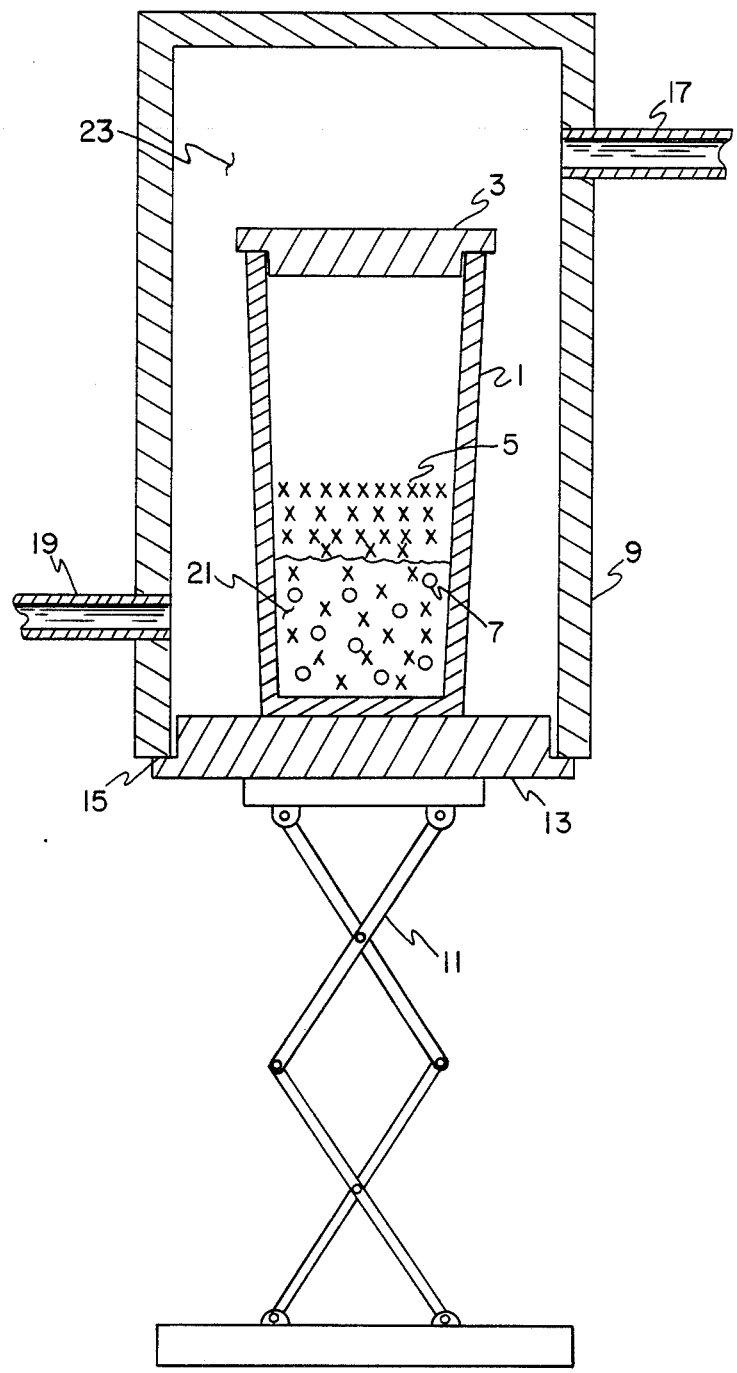
FIG. 1 shows a batch-operation apparatus in which molten, magnesium-fluoride residues are being freed of radioactive components by reaction in a graphite container which holds graphite chips and also holds molten, magnesium-fluoride residues into which magnesium has dissolved.

In FIG. 1, a graphite container 1 with container lid 3 has been loaded with graphite chips 5 and with solid magnesium-fluoride residues and magnesium source material 7. This magnesium source material may be magnesium reductant or it may be lithium, calcium, barium, strontium, or rare earth metals, which materials will react with magnesium fluoride to produce magnesium in solution in the molten, magnesium-fluoride residues.

The graphite container 1 is placed into a furnace 9 by use of a jack 11 which lifts a bottom door 13 up to make a furnace seal 15. The container lid 3 is lifted (device not shown) to permit removal of air. Air in the sealed furnace 9 is replaced by passing unreactive gas into the inlet port 17 and out the exit port 19. After the air has been swept out, the container lid 3 is replaced and the furnace is heated, creating molten, magnesium-fluoride residues 21 in an inert-gas atmosphere 23. The furnace 9 is of common construction known to those versed in the art: For example, the furnace can be resistively heated with silicon carbide elements (not shown). For reasons to be discussed in the next paragraph, the silicon heater elements would be placed low in the furnace, to keep that region hotter than the top region of the furnace. The insulation can be standard firebricks with high-alumina firebricks providing an inner lining where the highest temperatures of around 1275° C. are found.

The furnace is deliberately operated with a temperature gradient to cooler temperatures above the molten, magnesium-fluoride residues 21. Under these operating conditions, the magnesium formed by the magnesium source material 7 partially dissolves in the molten, magnesium-fluoride residues 21 and partially vaporizes, refluxing in the cooler upper regions of the graphite container 1 and returning to the molten, magnesium-fluoride residues after condensation.

When the molten, magnesium-fluoride residues have been substantially freed of radioactive components, following reactions to be discussed, the furnace is opened, the graphite container 1 is lowered from the furnace, and molten, magnesium-fluoride residues are poured out. Equipment to handle lifting and pouring are known to those versed in the art.

This treatment of the molten, magnesium-fluoride residues 21 accomplishes the following reactions which are critical for decontamination of those residues:

The formation of uranium carbide (primarily UC, but the formation of other uranium carbides will produce similar results) replaces Reaction 3 with a more complete reaction:

$$2UF_3 + 3Mg + 2C = 3MgF_2 + 2UC \qquad (4)$$

This reaction is favored by $-118$ Kcal/mole of reaction at 1550K (1277° C.), leading to a thermodynamic equilibrium constant with logarithm equal to 16.6.

Under the conditions of the reaction in the apparatus of FIG. 1, there will be unit thermodynamic activities for $MgF_2$, C, and UC. The magnesium will be in solution in the molten, magnesium-fluoride residues at a temperature above its atmospheric boiling point, and its activity will be approximately 0.25. These conditions reduce the amount of the radioactive component, uranium fluoride, in the molten (and later cooled and solid) magnesium-fluoride residue to less than 1 ppm of uranium. Thus, $UF_3$ has been removed to an environmentally acceptable level by this treatment with carbon and magnesium as just described.

Another radioactive component, molten uranium, if present, is removed according to the reaction:

$$U + C = UC \qquad (5)$$

This reaction is favored by $-26$ Kcal/mole, but the actual number is not critical because the uranium becomes tied up in a compound, and neither metallic uranium nor its carbides have significant solubility in the molten magnesium fluoride. Thus, radioactive metallic uranium is removed to less than 1 ppm, an environmentally acceptable level.

Depending primarily upon the amount of oxide present, the uranium-oxide radioactive component can be handled by various reactions which will be discussed as different cases.

Case I—Relatively small amounts of oxide are present, e.g., less than 2.5 mole %. Here, the controlling reaction is:

$$UO_2 + 2Mg + C = UC + 2MgO \qquad (6)$$

with a thermodynamic equilibrium constant whose logarithm is about 4 at 1550K, applying to thermodynamic standard conditions. Following arguments known to those versed in the art of thermodynamics, the equilibrium concentration of dissolved $UO_2$ for these nonstandard conditions can be approximated as follows: At this temperature the solubility of MgO in $MgF_2$ is about 10 mole % and that of $UO_2$ as the oxide (i.e., without disproportionation to form fluorides) is about 1 mole %. As discussed earlier, the thermodynamic activity of the magnesium is taken to be 0.25, and the activity of the MgO at one fourth of saturation can also be taken to be 0.25. The solubility of $UO_2$ of 1 mole % leads to an activity coefficent of 100, leading to an unremoved $UO_2$ concentration of $10^{-4}$ mole %; correcting for different molecular weights, an environmentally acceptable 4 ppm of uranium remains as unremoved uranium oxide in the magnesium-fluoride residues.

Case I applies directly to removal in the conditions of FIG. 1.

Case II—Eutectic lowering of operating temperatures. Although Case I provides adequate removal of uranium oxide, it does not offer much safety factor, e.g., if the reactions have not been carried completely to equilibrium the decontamination may not be acceptable. Also, the melting temperature of magnesium fluoride (1261° C.) is high, and the creation of high temperature is expensive. Thus, it may prove to be economically advantageous if the radioactive contaminants can be removed more completely and at lower temperatures, as follows:

If a salt is added to the magnesium fluoride, the solution formed will have a lower melting point than that of pure magnesium fluoride. An acceptable salt additive is 25 mole % of calcium chloride which produces completely molten salt at the magnesium boiling point 1090° C. At this lower temperature, Reaction 6 becomes more favorable for $UO_2$ removal, and the equilibrium decontamination of the magnesium-fluoride residues will leave less than 0.1 ppm of uranium oxide. The calcium chloride can be dissolved in water to reduce the waste and recycle the chloride.

Many other salts would be acceptable additives, e.g., calcium fluoride, lithium fluoride, and barium fluoride.

Because of the lower operating temperature and lower vapor pressure of magnesium, the magnesium evaporation is greatly reduced, and the use of the container lid 3 is less important at these lower temperatures. This fact has relevance which will be discussed regarding the next figure, but the Case II conditions could also be carried out in the apparatus of FIG. 1.

Case III—Preliminary oxide removal. Applicant's experience indicates that the presence of too much oxide (especially undissolved solid oxide) in fluoride melts can thicken such melts so that they become difficult to handle. Therefore, preliminary removal of oxide may be necessary, i.e., before melting.

One way to remove this excess oxide can be carried out in the system shown in FIG. 1, but before melting and before magnesium source material has been added. Here carbon tetrachloride vapor, or the vapor of other carbon-halogen compounds, is introduced in place of the inert-gas atmosphere 23. When heated to temperatures below the melting point of the magnesium-fluoride residue, the carbon tetrachloride will react with the oxides of uranium and magnesium to form chlorides and carbon monoxide, e.g.:

$$2MgO + CCl_4 + C = 2MgCl_2 + 2CO \qquad (7)$$

thereby removing enough oxide (both $UO_2$ and MgO) to make Reaction 6 become highly favorable when magnesium source material is added and the magnesium-fluoride residues are molten.

Finally, there is the lingering radioactivity which is not associated directly with the uranium. Applicant's experiments with penetrator-weapon material show that the radioactivity which does not chemically follow the uranium removal is primarily thorium ($Th^{234}$ from the alpha decay of $U^{238}$). This material has a half life of 24 days in decaying to long-lived $U^{234}$, and storage is an effective way to remove this radioactive component.

Thus, all the radioactive components are effectively removed by the simple and commercially practical treatment described regarding FIG. 1. This statement applies both for theoretical analyses and for actual reduction to practice as will be discussed.

Figure 2:
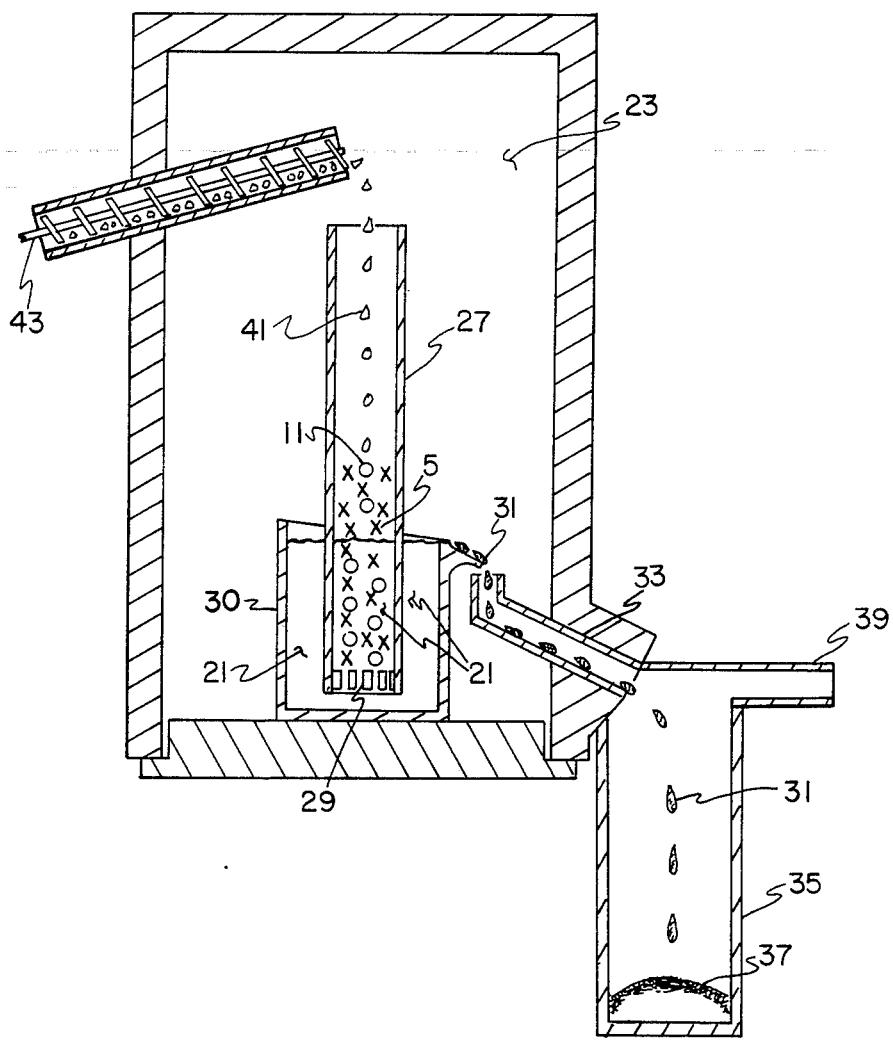
FIG. 2 shows an apparatus designed to allow continuous treatment of molten, magnesium-fluoride residues to remove radioactive components.

FIG. 2 indicates how the same chemistry for removal of radioactive components can be applied in continuous operations. The graphite cup 1 of FIG. 1 is replaced by a graphite tube 27 and perforated support 29 which supports graphite chips 5. The molten, magnesium-fluoride residues 21, including 25 mole % of added calcium chloride, are held at 1075° C. in the graphite tube and in a graphite cup 30, filling the graphite cup to its pouring lip. Magnesium source material 11 is held below the magnesium boiling point of 1090° C., so a container lid is not needed.

Molten, magnesium-fluoride residues which have been substantially freed of radioactive components move as droplets 31 out of the pouring lip of the graphite cup 30, through a discharge conduit 33 to a removable discharge container 35 where the molten, magnesium-fluoride residues solidify to solid residue 37 for disposal. A modified gas-exit port 39 replaces the exit port 19 of FIG. 1.

The movement of the droplets 31 is caused by additions of solid magnesium fluoride residues 41 plus calcium chloride additives and magnesium source material 11 into the graphite tube 27, both being moved through the continuous action of a feeding mechanism 43. As is usually the case for continuous operations vs. batch operations, the removal of radioactive materials from molten, magnesium-fluoride residues is anticipated to be more effective for continuous operations such as those used in the apparatus of FIG. 2.

I claim:

1. A method for separating radioactive components from magnesium-fluoride residues resulting from the magnesium reduction or uranium fluoride, comprising: (a) charging a container with radioactive magnesium-fluoride residues, at least one reactant selected from the group consisting of magnesium, magnesium alloys, lithium, calcium, barium, strontium, and the rare-earth metals, and with carbon, (b) heating the said container, in an inert atmosphere, until substantial melting of said residues is achieved thus causing said residues to react with said at least one reactant and carbon to form molten $MgF_2$ and uranium carbide, and (c) separating the resulting uranium carbide, which is essentially insoluble in the molten $MgF_2$, from said molten $MgF_2$, which is thus substantially radioactive free.

2. The method of claim 1 in which the substantially radioactive free $MgF_2$ comprises a thorium-234 containing component and said $MgF_2$ is stored to allow decay of said thorium.

3. The method of claim 1 in which salts of calcium, lithium, and barium are added to the said magnesium-fluoride residues to lower the melting temperatures of the said magnesium-fluoride residues.

4. The method of claim 1 in which said radioactive magnesium-fluoride residues contain oxides which are reduced by a preliminary reaction with gaseous carbon-halogen compounds.

5. The method of claim 1 in which the magnesium source material is magnesium.

6. The method of claim 1 in which said at least one reactant is magnesium alloy.

7. The method of claim 1 in which said at least one reactant is lithium.

8. The method of claim 1 in which said at least one reactant is calcium.

9. The method of claim 1 in which said at least one reactant is barium.

10. The method of claim 1 in which said at least one reactant is strontium.

11. The method of claim 1 in which said at least one reactant is rare-earth metals.

12. The method of claim 1 in which the carbon is in the form of a carbide.

* * * * *